UNITED STATES PATENT OFFICE.

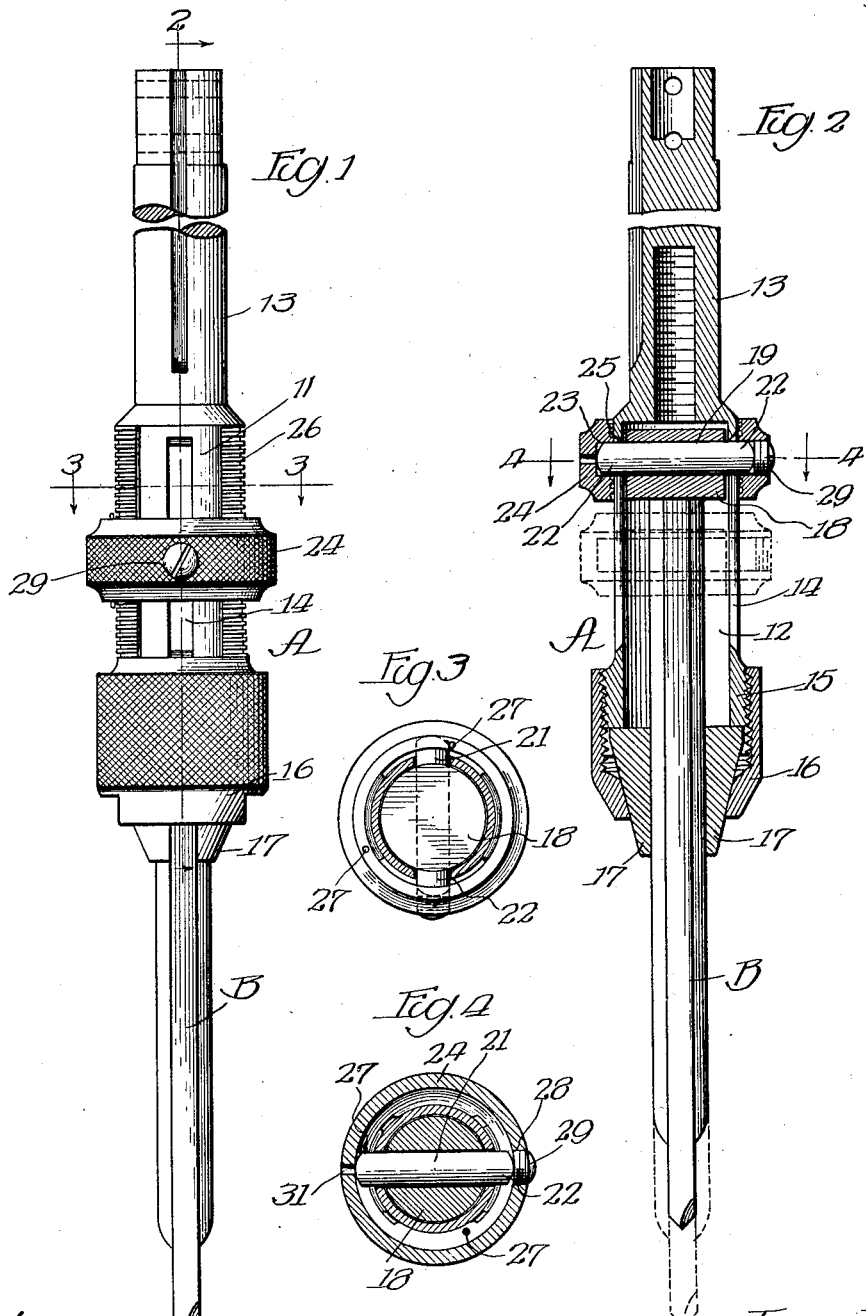

HARRY B. SHREVE, OF CHICAGO, ILLINOIS, ASSIGNOR TO LOVEJOY TOOL WORKS, OF CHICAGO, ILLINOIS, A CORPORATION OF ILLINOIS.

DRILL-CHUCK.

1,385,501.   Specification of Letters Patent.   Patented July 26, 1921.

Application filed January 5, 1917.  Serial No. 140,660.

*To all whom it may concern:*

Be it known that I, HARRY B. SHREVE, a citizen of the United States, residing in Chicago, in the county of Cook and State of Illinois, have invented a new and useful Improvement in Drill-Chucks, of which the following is a specification.

This invention relates in general to chucks for drills and the like and has more particular reference to chucks of the general character described in Patent No. 1079520, granted to me on November 25, 1913, for improvement in chucks.

A principal object of this invention is the provision of a chuck adapted to hold firmly a drill or similar tool in position which will cause it to project a definite distance from the chuck and this without regard to the length of the drill.

My present invention has a valuable use in portable drilling apparatus, such as apparatus for drilling railroad rails and the like. In apparatus for this character the movement of the chuck which holds the drill is necessarily limited, and it is particularly desirable that drills extend from the chuck a desired predetermined distance. Breaking off the end of the drill and frequent sharpening cause it to become materially shorter with use, and this invention aims to compensate for this continued shortening through the provision of simple and readily operated means for adjusting the position of the drill in the chuck.

A further object of the invention is the provision of such a structure having sensitive adjustment.

Other objects and advantages of the invention will be apparent as it is better understood from the following description when considered in connection with the accompanying drawing illustrating a preferred embodiment thereof.

On the drawing,

Figure 1 is a perspective view of a chuck and tool embodying my invention;

Fig. 2 is a section taken substantially on the line 2—2 of Fig. 1;

Fig. 3 is a section taken substantially on the line 3—3 of Fig. 1; and

Fig. 4 is a section taken on the line 4—4 of Fig. 2.

For the purpose of illustrating my invention I have shown on the drawing a chuck generally designated at A embodying my invention and carrying a drill B.

The chuck A comprises a head 11 provided with an axial bore 12 and carrying a shank 13 of any usual or preferred construction. The head A is provided with a pair of oppositely disposed slots 14 extending longitudinally of the head from adjacent the shank to its threaded portion 15 on which the usual holding cap 16 is provided to force the dogs 17 into engagement with the drill when the latter is in place. A stop block 18 is mounted to move axially of the head and is of substantially cylindrical form. This block has an aperture 19 through which a stop pin 21 extends. The stop pin and stop block constitute what may be termed a stop against which the inner end of the drill bit rests. The pin 21 extends through the slots and its ends 22 project beyond the head. These ends extend into a slot 23 formed in a collar 24 disposed about the head. The connection between the collar and pin causes the stop to move when the collar is moved axially of the head and permits independent rotary movement of the collar. When it is desired to adjust the chuck the stop is moved axially of the head through axial movement of the collar the desired distance, and then the collar is turned about the axis of the chuck to lock it in place. This turning movement causes interrupted screw threads 25 within the collar to engage interrupted screw threads 26 on the outer face of the head. In the present instance the threads on both parts are interrupted at two opposite locations throughout a distance equal to slightly more than a quarter of a circumference at each location. The collar may be turned to bring its threads clear of the threads of the chuck body in order that axial movement of the collar and stop may be accomplished. A pair of stops 27 are provided through the collar and extend across the slot 23 to limit the rotary movement of the collar so that movement in one direction will bring a stop 27 in engagement with an end of the pin with the threads of the collar out of engagement with the threads of the chuck body and engagement of the other stop 27 with a pin end will occur when the two parts of the interrupted threads within the collar are in engagement with the parts of the interrupted threads on the chuck body.

In order that the device may be readily assembled I provide an aperture 28 through the collar 24 of sufficient size to permit passage of the stop pin 21. To assemble the parts of the chuck the cap 16 and jaw 17 are removed and the stop block 18 is dropped in place. It is then moved to bring the aperture 19 in registration with the slots of the side walls. The collar is positioned and the pin inserted through the aperture 28 extending through it then through the slot 14 through the stop block and through the opposite slot into place. A plug 29 is provided to close the aperture 28 if desired. A smaller aperture 31 is provided diametrically opposite the aperture 28 to permit insertion of a suitable implement to push the pin out through the aperture 28 should occasion require. Thereafter one or both of the stops 27 may be positioned.

It will be noted from viewing Fig. 4 that the stops 27 can be so arranged as to prevent the stop pin from alining with the aperture 28 in the collar while both stops 27 are in place. Such an arrangement prevents falling out of the stop pin 21 should the block 29 not be used.

It will be manifest that a chuck embodying my invention permits sensitive adjustment of the stop by reason of the fact that the collar may be locked at any place on the chuck body.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:

1. In a chuck, the combination of an axially bored head provided with oppositely arranged longitudinally extending slots, a stop extending through said slots and out of the head at each side, and a collar rotatably embracing the ends of said stop, said collar being adapted to engage the head and hold the stop in desired position, said collar and stop being slidably movable longitudinally of said head, and coöperating threads on said collar and head for locking said collar and stop in adjusted positions.

2. In a chuck, the combination of an axially bored head provided with oppositely arranged longitudinally extending slots, a stop extending through said slots and out of the head at each side, and a collar rotatably embracing the ends of said stop, said collar being adapted to engage the head and hold the stop in desired position, said collar and head having interrupted threads for locking said collar in place and preventing disengagement of the collar and head to permit the collar and stop to be slid longitudinally of the head.

3. In a chuck, the combination of an axially bored head having a pair of oppositely arranged longitudinally extending slots through its side walls, a stop extending through said slots and out of the head at each end, and a collar rotatably embracing the ends of said stop, said collar and said head having engageable interrupted coöperating threads for locking said stop in desired position.

In testimony whereof, I have hereunto signed my name in the presence of two subscribing witnesses.

HARRY B. SHREVE.

Witnesses:
W. H. DANGEL,
M. E. BRENNAN.